(No Model.)
C. FRIEDEL.
GALVANIC BATTERY.
No. 260,859. Patented July 11, 1882.
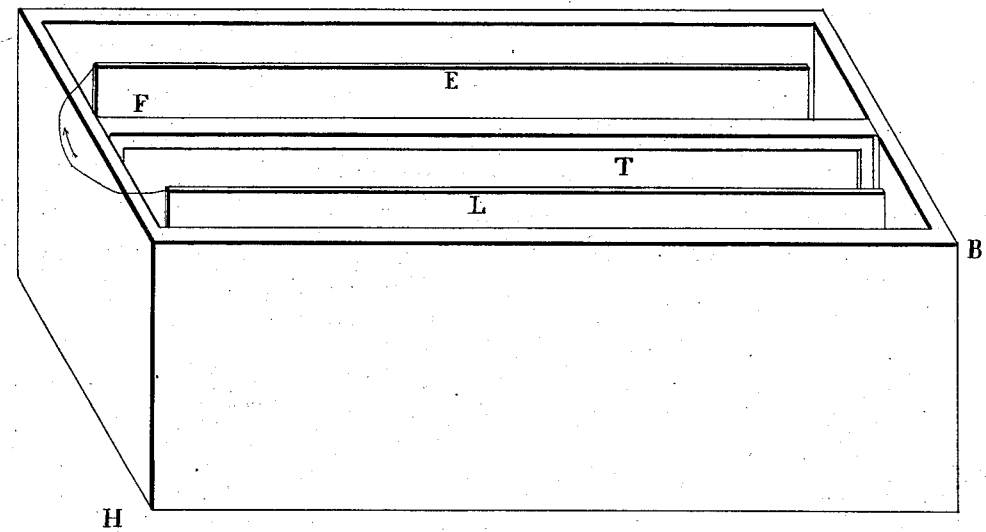
Witnesses:
O. C. Hempel
F. J. Lamb
Inventor.
Charles Friedel

United States Patent Office.

CHARLES FRIEDEL, OF MADISON, WISCONSIN.

GALVANIC BATTERY.

SPECIFICATION forming part of Letters Patent No. 260,859, dated July 11, 1882.

Application filed March 25, 1882. (No model.)

*To all whom it may concern:*

Be it known that I, CHARLES FRIEDEL, a citizen of the United States, residing at Madison, in the county of Dane and State of Wisconsin, have invented certain new and useful Improvements in Galvanic Batteries; and I do hereby declare the following to be a clear and exact description of the invention, such as will enable others skilled in the art to which it appertains to make and use it, reference being had to the accompanying drawings, which form part of this specification.

My invention relates to improvements in galvanic batteries of the type of the Daniell battery, in which a suitable cloth is by the use of paraffine substituted for a porous cup and a paraffined wooden box is substituted for the ordinary glass or earthen jar, copper vessel, or other vessel intended to hold the contents of a battery.

In the annexed drawings similar letters refer to similar parts throughout the two views.

Figure I represents the complete battery in action. L and E are the copper and zinc electrodes. T represents the cloth partition, with the wooden frame F around it; and A H B represent the paraffined wooden box which constitutes the battery-cup, and into which the framed cloth partition is fastened.

Fig. II is intended to give a more distinct view of the cloth partition T, (the electrodes L and E and a portion of the box being removed for this purpose.)

It is a well-known serious objection to the Daniell battery that metallic copper deposits rapidly upon and throughout the walls of the porous cup, thereby always materially reducing the efficiency of the battery and frequently interrupting its action entirely. A great many changes in the form and arrangement of this battery have been made by scientific inventors to remedy this difficulty, some—as Hill and others—dispensing entirely with the use of the porous cup; but it is a well-known fact that where these inventors have succeeded in removing the objection in connection with the porous cup an almost equally serious objection has been added to the improved form which did not exist in the original—as, for instance, in the Hill gravity battery rapid consumption of zinc has been sacrificed to get rid of the objections of the porous cup.

In my improvements on the Daniell battery I remedy the objections in connection with the use of the porous cup, first, by substituting in its place a cloth sufficiently dense to allow scarcely any or no liquid to transude through it while the battery is either in action or out of action, which cloth is properly paraffined around its edges and fastened by paraffine into a paraffined wooden box in such a manner as to form the two required chambers for the reception of the two fluids; second, by substituting the afore-mentioned paraffined wooden box for the glass jar or other vessel intended for the battery-cup; third, by using a solution of sodium chloride instead of dilute sulphuric acid, usually used in the Daniell battery. It is well known among scientists that Daniell tried a solution of sodium chloride as a substitute for sulphuric acid. However, the sodium chloride as used with the earthen porous cup was found to increase the objection, and for this and other reasons the use of sodium chloride in the Daniell battery has never become practical, even though it is much cheaper and preferable for other reasons to the use of sulphuric acid. A solution of sodium chloride, however, as used in connection with a cloth partition, is especially suitable, inasmuch as it does not attack the fiber of the cloth, and the battery is free from the afore-mentioned objections in the use of sodium chloride in combination with a cloth partition. Other salts may be used as a substitute for sulphuric acid—as, for instance, sodium nitrate or potassium nitrate, either of which will do, but are not as good as sodium chloride. Any wooden box, neatly put together, of any kind of wood, will do for the purpose above mentioned, provided it is thoroughly soaked in paraffine, and of course does not leak after the paraffine solidifies. An ordinary cigar-box is well suited for this purpose. I use mainly twelve-ounce duck for a cloth partition for batteries in frequent use. However, heavier cloth is preferable for a more thorough separation of the fluids when the battery is allowed to stand idle for any considerable period.

The cloth partition T, as represented in the annexed drawings, is prepared and fastened into the box A H B substantially in the following manner: After the cloth is cut to the required size its edges are soaked in paraffine. When the cloth has become somewhat rigid and stiff from the cooled and solidified paraffine upon its edges it is pressed into a flat shape, or any other desirable shape, and trimmed so as to make it fit snugly into the box. The prepared cloth is then inserted into its proper position in the box and permanently secured by pouring melted paraffine into the bottom of the box in sufficient quantity to completely cover the lower edge of the cloth. When the paraffine thus poured in has solidified the box is turned over on one end and dipped into a vessel containing melted paraffine just sufficiently to allow the paraffine to cover the corresponding edge of the cloth partition. By dipping the box in and removing it a number of times the cloth becomes firmly fastened to the end of the box. The same thing of course is repeated with the other end of the box, whereupon the box, with the inserted cloth partition, is ready for use.

In case large surface is required in a battery, it is preferable to first frame the cloth in a paraffined wooden frame before fastening it into the box, as the shrinking of the cloth in a large piece is liable to crack the paraffine. Any frame made of wood, and constructed after the manner of the frame of an ordinary slate, into which the cloth can be fastened by means of nails or brads or other devices, will answer this purpose. Where nails are liable to be exposed to the action of sulphate of copper used in the battery it is best to use copper nails or brads, as these do not deposit metallic copper in a solution of sulphate of copper. It is necessary to paraffine the bottom edge of the cloth to quite an extent upward from the edge—a half-inch, an inch, and sometimes more, according to the size of the battery—and it is further necessary to keep the zinc and copper electrodes from touching the cloth partition, in order that no metallic copper shall deposit upon it. If, however, by some accident the plates touch the cloth, and metallic copper is deposited upon the cloth, or if some nail not thoroughly protected by paraffine should deposit metallic copper upon the cloth, it can be readily scraped off without injury to the cloth or without interference with the action of the battery—a thing impossible in the use of the porous cup. Furthermore, the galvanic battery, substantially as described, can be put into a much smaller and more compact form without decreasing the efficiency of the battery, is much lighter, and is much cheaper than the ordinary Daniell battery. The paraffine protects the light wood thoroughly from the otherwise injurious action of the fluids; nor do the fluids have any deleterious action upon the cloth.

Having fully described my invention, what I claim, and desire to secure by Letters Patent, is—

1. In a galvanic battery of two fluids, the cloth partition T, paraffined around its edges and fastened by paraffine into a paraffined wooden box, A H B, for the purpose set forth in this specification.

2. In a galvanic battery of two fluids, the paraffined wooden frame F, united to the cloth partition T by means of paraffine, substantially as shown and for the purpose specified.

CHARLES FRIEDEL.

Witnesses:
O. E. HAMPEL,
F. J. LAMB.